United States Patent [19]  [11] 4,042,539
Fanning  [45] Aug. 16, 1977

[54] PRIMER-SURFACER COMPOSITION OF AN ACRYLIC POLYMER, A POLYESTER RESIN AND AN ORGANIC DISPERSANT

[75] Inventor: Herbert H. Fanning, Bryn Mawr, Pa.

[73] Assignee: E. I. Du Pont de Nemours and Company, Wilmington, Del.

[21] Appl. No.: 627,461

[22] Filed: Oct. 30, 1975

Related U.S. Application Data

[63] Continuation-in-part of Ser. No. 350,645, April 12, 1973, abandoned.

[51] Int. Cl.$^2$ .......................... C08K 5/01; C08K 5/04; C08L 1/14; C08L 67/02
[52] U.S. Cl. .................... 260/16; 260/17 R; 260/31.2 N; 260/31.2 XA; 260/31.4 R; 260/32.8 N; 260/33.2 R; 260/33.4 R; 260/33.6 UA; 260/42.52; 260/862
[58] Field of Search .................. 260/16, 17 R, 31.2 R, 260/31.2 XA, 31.4 R, 32.8 R, 33.2 R, 33.4 R, 33.6 R, 33.6 UA, 862

[56] References Cited

U.S. PATENT DOCUMENTS

| | | | |
|---|---|---|---|
| 2,649,382 | 8/1953 | Vesce | 106/193 J |
| 2,873,210 | 2/1959 | Barrett et al. | 428/458 |
| 3,272,647 | 9/1966 | Swenson et al. | 428/416 |
| 3,325,443 | 6/1967 | Christenson et al. | 260/42.52 |
| 3,475,388 | 10/1969 | Yocum | 526/52 |
| 3,505,269 | 4/1970 | Jefery et al. | 260/32.8 R |
| 3,509,086 | 4/1970 | Rohrbacher | 260/32.8 R |
| 3,627,779 | 12/1971 | Sandstedt | 428/418 |
| 3,666,710 | 5/1972 | Makhlouf et al. | 260/33.6 UA |
| 3,686,111 | 8/1972 | Makhlouf et al. | 260/31.2 N |
| 3,705,076 | 12/1972 | Usala | 156/331 |
| 3,705,816 | 12/1972 | Zwahlen et al. | 106/308 C |
| 3,746,673 | 6/1973 | Simms et al. | 260/22 CD |
| 3,788,996 | 1/1974 | Thompson | 252/62.54 |
| 3,959,193 | 5/1976 | Potman et al. | 260/15 |

Primary Examiner—Allan Lieberman

[57] ABSTRACT

The primer-surfacer composition contains a binder of
  an acrylic polymer of methyl methacrylate, an alkyl acrylate or an alkyl methacrylate and an ethylenically unsaturated carboxylic acid that is reacted with an alkylene imine such as ethylene imine, or propylene imine,
  a polyester resin, and
  an organic dispersant;
  and the primer-surfacer contains suitable pigments such as talc, barytes, titanium dioxide and zinc oxide pigments;
  the composition is primarily used over unprimed, primed or previously finished metal substrates to provide a surface to which an acrylic lacquer, an acrylic enamel, an alkyd enamel or a polyurethane enamel coating can be applied and provides a finish for automobiles and trucks which has excellent intercoat adhesion, excellent chip resistance, corrosion resistance and resistance to deterioration from exposure to water and high humidity.

11 Claims, No Drawings

PRIMER-SURFACER COMPOSITION OF AN ACRYLIC POLYMER, A POLYESTER RESIN AND AN ORGANIC DISPERSANT

CROSS-REFERENCE TO RELATED APPLICATIONS

This application is a continuation-in-part of application Ser. No. 350,645, filed Apr. 12, 1973 and now abandoned.

BACKGROUND OF THE INVENTION

This invention is related to a coating composition and in particular to a primer-surfacer composition of an acrylic polymer, a polyester resin and an organic dispersant.

A primer-surfacer composition comprises a high solids coating composition that is used to fill small imperfections in the substrate and usually is sanded to form an even coating over which a topcoating is applied.

Primer and sealer compositions are well known in the automobile and truck manufacturing industry and are applied over steel substrate and form a smooth, even surface over which either an acrylic lacquer, an acrylic dispersion, an acrylic enamel, a polyurethane enamel or an alkyd enamel topcoat can be applied. Typical sealer and primer compositions are shown in Barrett et al. U.S. Pat. No. 2,873,210, issued Feb. 10, 1959; Swanson and Walus, U.S. Pat. No. 3,272,647, issued Sept. 13, 1966; Jeffery et al., U.S. Pat. No. 3,505,269, issued Apr. 7, 1970; Rohrbacher, U.S. Pat. No. 3,509,086, issued Apr. 28, 1970, and Sandstedt, U.S. Pat. No. 3,627,779, issued Dec. 14, 1971. These primer sealer compositions are of a high quality and are excellent for many purposes; however, there is a great need today in the repair of automobile and truck bodies for a low cost composition that has outstanding chip, blister and corrosion resistance, that has an exceptional high level of adhesion to primer coatings, base metals, and previously painted surface of acrylic lacquer or enamels or alkyd enamels. The composition should fill in small cracks and imperfections in the substrate and be easily sanded to a smooth surface. The composition should provide a surface to which the aforementioned lacquers and enamels will adhere.

The novel primer-surfacer composition of this invention has the aforementioned characteristics and is useful in the repair of automobile and truck bodies.

SUMMARY OF THE INVENTION

The primer-surfacer composition of this invention comprises 10-60% by weight of a binder that is dissolved in 40-90% by weight of an organic solvent for the binder; wherein the binder consists essentially of A. 60.0-95.0% by weight, based on the weight of the binder, of an acrylic polymer of
 1. methyl methacrylate,
 2. an alkyl methacrylate having 2-8 carbon atoms in the alkyl group or an alkyl acrylate having 2-12 carbon atoms in the alkyl group, and
 3. an ethylenically unsaturated carboxylic acid that is reacted with an alkylene imine;

B. 4.9-39.9% by weight, based on the weight of the binder, of a polyester resin of an alkylene glycol having 2-6 carbon atoms, a saturated aliphatic dicarboxylic acid and an aromatic carboxylic acid or its anhydride;

C. 0.1-8.0% by weight, based on the weight of the binder, of an organic dispersant;

and containing pigment in a pigment to binder ratio of about 100:100 to about 600:100.

DESCRIPTION OF THE INVENTION

The primer surfacer composition has a polymeric binder content of about 10-60% by weight, and preferably, a binder content of about 15-25% by weight. The composition preferably contains pigment in a pigment to binder ratio of about 100:100 to 300:100.

The polymeric binder of the composition preferably comprises about 75.0-95.0% by weight of the acrylic polymer, 4.9-24.9% by weight of the polyester resin and 0.1-5.0% by weight of the organic dispersant. Another preferred binder comprises about 80.0-90.0% by weight of the acrylic polymer, about 7.8-19.8% by weight of the polyester resin, and about 0.2-2.2% by weight of the organic dispersant. Still another preferred binder comprises 80-90% by weight of the acrylic polymer, 5-12% by weight of the polyester resin and 5-8% by weight of the organic dispersant.

The acrylic polymer is prepared by conventional solution or bulk polymerization techniques in which the monomers, polymerization catalyst and solvents are charged into a polymerization vessel and heated to form a polymer of the desired molecular weight as indicated by the viscosity of the polymer and subsequently reacted with an alkylene imine. One preferred method for preparing these acrylic polymers is in Usala U.S. Pat. No. 3,705,076, issued Dec. 5, 1972.

The acrylic polymer comprises methyl methacrylate, an alkyl acrylate having 2-12 carbon atoms in the alkyl group, or an alkyl methacrylate having 2-8 carbon atoms in the alkyl groups and an ethylenically unsaturated carboxylic acid.

Typical alkyl methacrylates that can be used to prepare the acrylic polymer are ethyl methacrylate, propyl methacrylate, isopropyl methacrylate, butyl methacrylate, tertiary butyl methacrylate, hexylmethacrylate, 2-ethylhexyl methacrylate, octyl methacrylate and the like. Typical alkyl acrylates are ethyl acrylate, propyl acrylate, butyl acrylate, isobutyl acrylate, propyl acrylate, hexyl acrylate, 2-ethyl hexyl acrylate, octyl acrylate, nonyl acrylate, decyl acrylate, lauryl acrylate and the like.

Typical ethylenically unsaturated acids that can be used to prepare the acrylic polymer are methacrylic acid, ethacrylic acid, acrylic acid, itaconic acid, and the like. Methacrylic acid and acrylic acid are preferred.

Any of the alkylene imines mentioned in the above Usala patent can be used to iminate the acrylic polymers. Ethylene imine and propylene imine are preferred and are used in amounts of about 4-6% by weight of the acrylic polymer.

One preferred acrylic polymer used in the novel composition of this invention contains
 1. 70-90% by weight methyl methacrylate,
 2. 9-19% by weight of an alkyl acrylate having 2-12 carbon atoms in the alkyl group, and
 3. 1-11% by weight of either acrylic acid or methacrylic acid and is reacted with about 1-8% by weight of an alkylene imine such as propylene imine or ethylene imine.

One particularly useful acrylic polymer that gives a high quality composition consists essentially of
 1. 78-82% by weight of methyl methacrylate,
 2. 9-17% by weight of ethyl acrylate, 3. 5-9% by weight of methacrylic acid and
is reacted with about 4-6% by weight of ethylene imine or propylene imine.

One highly preferred acrylic polymer of this type which gives a high quality product consists essentially of methyl methacrylate/ethyl acrylate/methacrylic acid in a weight ratio of 80/13/7 and is reacted with about 4-5% by weight of propylene imine.

The polyester resin used in the novel composition of this invention is the esterification product prepared by conventional techniques of an alkylene glycol having 5-6 carbon atoms, a saturated aliphatic dicarboxylic acid and an aromatic carboxylic acid. The polyester resin has a hydroxyl number of up to 15 and an acid number of up to 10.

Typical saturated aliphatic dicarboxylic acids are adipic acid, succinic acid, malonic acid, glutaric acid, sebacic acid and azelaic acid. Typical glycols are ethylene glycol, propylene glycol, butylene glycol, neopentyl glycol and the like. Typical aromatic carboxylic acids are benzoic acid, phthalic acid or its anhydride, paratertiary butyl benzoic acid and the like.

Preferably the polyester resin is of about 25 to 48 mole percent of the saturated aliphatic dicarboxylic acid, such as adipic acid, 40 to 50 mole percent of the glycol, such as ethylene glycol, and 2 to 35 mole percent of the aromatic carboxylic acid or its anhydride, such as phthalic anhydride or a mixture of phthalic anhydride and benzoic acid.

One particularly useful organic dispersant utilized in the composition has the structural formula

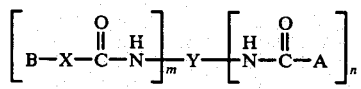

where
B is a polymeric segment, molecular weight of 500-100,000, preferably 1000-10,000, of ethylenically unsaturated monomers lacking Zerewitinoff hydrogen atoms;
X is a residue of a chain transfer agent;
y is the residue of a di-, tri- or tetraisocyanate radical;
A is the residue of a basic radical having a $pk_a$ value of 6-14, or a salt thereof, and
m and n are 1, 2 or 3.

When n is 2 or 3, only one of A need be as defined.

One particularly preferred organic dispersant has the structure

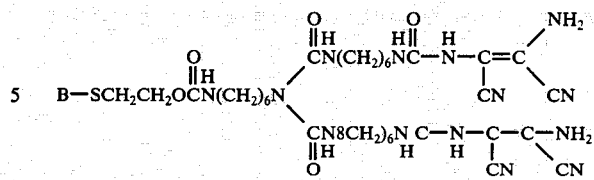

where B is a methylmethacrylate/2-ethylhexyl acrylate (MMA/2-EHA) copolymeric segment having a number average molecular weight of about 3,000 to 10,000.

Another preferred organic dispersant that forms a high quality product has the structure

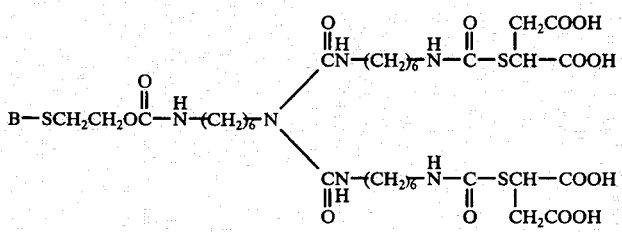

B is defined in the above formula.

The composition can contain in addition to the aforementioned binder up to 20% by weight, based on the weight of the binder, of cellulose acetate butyrate. usually, about 2-20% by weight of cellulose acetate butyrate is used. The cellulose acetate butyrate promotes dispersion of the pigments used in the composition and increases the adhesion of the composition to metal and non-metal substrates. The cellulose acetate butyrate can be used to increase viscosity of the composition by the addition of small amounts of cellulose acetate butyrate at the end of a preparation of the composition.

Typically useful cellulose acetate butyrates have a butyryl content of about 30-60%, by weight and a viscosity of about 2-25 seconds at 25° C. determined according to ASTM-D-1343-56. One particularly useful cellulose acetate butyrate has a butyryl content of about 35-39% and a viscosity (determined as above) of 20 seconds.

The binder of one high quality composition which contains cellulose acetate butyrate is 64-80% by weight of acrylic polymer, 9.8-20% by weight of the polyester resin, 0.2-2.0% by weight of the organic dispersant and 10-15% by weight of cellulose acetate buryrate.

Any of the conventional solvents or blends of solvents can be used to form the composition of this invention provided that the selection of solvents is such that the polymeric constituents are compatible and give a high quality primer-surfacer. The following are examples of solvents which can be used to prepare the composition: methylethyl ketone, methyl isobutyl ketone, toluene, acetone, xylene, isopropanol, ethylene glycol monoethyl ether acetate, and other esters, ethers, ketones and aliphatic, cycloaliphatic and aromatic hydrocarbon solvents. One preferred blend of solvents is toluene, xylene and isopropanol.

A variety of pigments, organic dyes and lakes can be utilized in the composition of this invention. Examples of the useful pigments are: metallic oxides, such as titanium dioxide, iron oxide, zinc oxide and the like; metal hydroxides, metal powders, sulfides, sulfates, carbonates, silicates such as aluminum silicate, carbon black, talc, china clay, barytes, iron blues, lead blues, organic reds and organic maroons and the like. One particularly preferred combination of pigments which provides a high quality primer-surfacer composition is a mixture of talc, barytes, zinc oxide, titanium dioxide, and carbon black. Another useful combination of pigments is a mixture of talc, barytes, zinc oxide, iron oxide and carbon black.

The primer-surfacer composition of this invention has excellent adhesion to a variety of pigmented primer coatings, such as alkyd primer coatings, alkyd/epoxy primer coatings, acrylic primer coatings, acrylic/epoxy primer coatings, nitrocellulose primer coatings and the like. Powder primer coatings can also be used. Also, the novel composition has excellent adhesion to plastics, such as acrylonitrile/butadiene/styrene plastics, fiberglass reinforced polyester, aluminum, untreated steel or treated steel, such as phosphatized steel or galvanized steel, and excellent adhesion to a variety of topcoats, such as alkyd or or acrylic enamels, polyurethane enamels, acrylic lacquers and arylic dispersion lacquers.

The substrate is prepared by filing and sanding and then the novel composition of this invention is applied over the substrate by any of the conventional application methods, such as spraying, electrostatic spraying, dipping, brushing, flowcoating, and the like. The coated substrate is then air-dried but can be force dried at elevated temperatures. Generally, the thickness of the dried primer-surfacer coat is 0.1–10 mils, and preferably about 1–5 mils. The primer-surfacer fills in minor imperfections in the substrate and can easily be sanded to form a smooth surface. An acrylic solution lacquean acrylic dispersion lacquer, an acrylic enamel, an alkyd enamel or a polyurethane acrylic enamel is then applied to the primer-surfacer coating surface and airdried to provide a topcoating about 0.5–3.0 mils thick. Optionally, the topcoat can be baked for example for 10 minutes at 95° c. and then for 45 minutes at 165° C.

The primer surfacer of this invention provides a smooth and even surface and when a topcoat is applied, the resulting finish has an excellent appearance, good gloss, good crack, chip and blister resistance, and good corrosion resistance. The primer-surfacer has the necessary balance of cost and good physical properties which make the primer-surfacer acceptable for the repair of automobile and truck bodies.

The following Examples illustrate the invention. All parts and percentages are on a weight basis unless otherwise indicated.

EXAMPLE 1

A mill base is prepared as follows:

| Portion 1 | Parts by Weight |
|---|---|
| Iminated acrylic polymer solution (40% polymer solids of an 80% methyl methacrylate/13% ethyl acrylate/7% methacrylic acid | |

| Portion 1 | Parts by Weight |
|---|---|
| polymer iminated with 4.64% propylene imine and having a Gardner Holdt Viscosity of V-Y in a solvent mixture of toluene/isopropanol/ethyl acetate) | 32.95 |
| Polyester resin solution (85% solids in toluene/methylethyl ketone in a 63/37 ratio of a polyester of ethylene glycol/adipic acid/phthalic anhydride/benzoic acid having an acid number of up to 10 and a hydroxyl number of up to 15) | 67.97 |

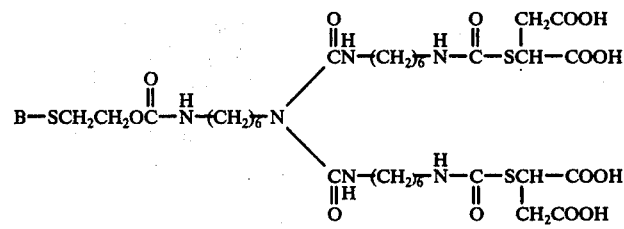

| | |
|---|---|
| Toluene | 4.12 |
| | 69.21 |
| Isopropanol | 32.95 |
| Xylene | 175.07 |
| Talc Pigment | 372.33 |
| Barytes Pigment | 144.18 |
| Zinc Oxide Pigment | 72.09 |
| Titanium Dioxide Pigment | 123.58 |
| Carbon Black Pigment | 2.88 |
| Portion 2 | |
| Iminated acrylic polymer solution (described above) | 195.67 |
| Total | 1,293.00 |

Portion 1 is blended together and then charged into a conventional high shear mixer and ground for 30 minutes to form a dispersion. Portion 2 is then added and thoroughly mixed with Portion 1.
A primer-surfacer composition then is prepared by blending together the following constituents:

| | Parts by Weight |
|---|---|
| Mill base (prepared above) | 796.82 |
| Iminated Acrylic Polymer solution (prepared above) | 307.18 |
| Total | 1,104.00 |

The primer-surfacer is reduced to a spray viscosity of 20–25 seconds No. 2 Zahn cup with a solvent mixture of acetone, methyl isobutyl ketone, methanol, isopropanol, ethylene glycol monoethyl ether acetate, toluene in a weight ratio of 15.43/2.90/3.00/11.49/3.00/64.18. The composition is sprayed onto the following substrates (four panels of each substrate are prepared):

1. a primed and sealed steel panel coated with a conventional acrylic automotive lacquer;
2. a primed steel panel coated with a conventional thermosetting acrylic automotive enamel;
3. a phosphatized steel panel;
4. a primed steel panel coated with an automotive alkyd enamel;
5. a phosphatized steel panel primed with a conventional alkyd resin black dip primer;
6. untreated cold roll steel;
7. untreated aluminum;
8. untreated galvanized steel;
9. fiberglass reinforced polyester;
10. ABS plastic (acrylonittrile/butadiene/styrene plastic);

11. a primed steel panel coated with a weathered alkyd enamel;
12. a primed steel panel coated with a weathered acrylic enamel;
13. a primed steel panel coated with a weathered acrylic lacquer; and
14. a primed steel panel coated with a weathered polyurethane acrylic enamel.

The primer-surfacer is then air-dried and in each case has a smooth and even appearance, and excellent adhesion to the substrate and is easily sanded to remove any imperfections. Set (3) of the above panels is coated with an alkyd enamel. Set (4) is coated with an acrylic automotive lacquer. Set (5) is coated with a standard thermosetting acrylic enamel. Set (6) is coated with a polyurethane acrylic enamel. Each set of panels is then air-dried or baked as required for the coating. The resulting finish in each case has a good appearance, has excellent chip resistance, blister resistance, and corrosion resistance, and in general is an acceptable finish for automobiles and trucks.

additional ten minutes. Portion 7 is added and mixing is continued for an additional 30 minutes. The resulting primer surfacer has a total solids content of about 60% and a pigment to binder ratio of 199/100.

The primer surfacer composition is reduced to a spray viscosity as in Example 1 using the same solvent mixture as in Example 1. The reduced composition is sprayed onto the same substrates as in Example 1 and air dried. In each case a smooth and uniform finish is formed that has excellent adhesion to the substrate.

Four sets (four panels per set) of phosphatized steel panels are coated with the primer surfacer composition and air dried. One set is coated with an alkyd enamel. A second set is coated with an acrylic automotive lacquer. A third set is coated with a conventional thermosetting acrylic enamel. A fourth set is coated with a polyurethane acrylic enamel. Each set is then air dried or baked as required for the coating. For each of the sets of panels, the resulting finish has a good appearance, excellent chip, blister and corrosion resistance and is considered an acceptable finish for automobiles and trucks.

EXAMPLE 2

A primer surfacer is prepared as follows:

| | Parts by Weight |
|---|---|
| Portion 1 | |
| Iminated acrylic polymer solution (described in Example 1) | 60.00 |
| Polyester resin solution (described in Example 1) | 26.76 |
| Organic Dispersant solution (61% solids in toluene of a dispersant having the general formula | 22.79 |

$$B-SCH_2CH_2OC(O)N(CH_2)_6N \begin{cases} C(O)NH(CH_2)_6NC(O)-N(H)-C(CN)=C(CN)-NH_2 \\ C(O)NH(CH_2)_6NC(O)-N(H)-C(H)(CN)-C(CN)-NH_2 \end{cases}$$

where B is a MMA/2-EHA copolymeric segment having a number average molecular weight of about 4,500)

| | |
|---|---|
| Xylene | 52.63 |
| Toluene | 44.26 |
| Portion 2 | |
| Isopropanol | 20.26 |
| Portion 3 | |
| Talc pigment | 112.10 |
| Barytes pigment | 88.63 |
| Zinc oxide pigment | 44.26 |
| Iron oxide pigment | 69.59 |
| Molacco carbon black pigment | 11.30 |
| Talc pigment | 72.10 |
| Portion 4 | |
| Talc pigment | 30.00 |
| Portion 5 | |
| Talc pigment | 10.00 |
| Portion 6 | |
| Xylene | 37.54 |
| Portion 7 | |
| Iminated Acrylic polymer solution (described in Example 1) | 398.78 |
| Total | 1101.00 |

Portion 1 is added to a high shear mixer and thoroughly mixed. Portion 2 is added and mixed for 15 minutes. The ingredients of Portion 3 are added in the order shown with constant mixing and mixed until a uniform dispersion is formed. Portion 4 is added with mixing, and then Portion 5 is added and mixed for 1.5 hours. Portion 6 is added at a uniform rate over a 15 minute period with constant mixing and mixed for an

EXAMPLE 3

A primer surfacer is prepared as follows:

| | Parts by Weight |
|---|---|
| Portion 1 | |
| (described in Example 1) | 40.46 |
| Polyester resin solution | |

|  | Parts by Weight |
|---|---|
| (described in Example 1) | 31.44 |
| Organic Dispersant solution | 1.91 |
| (described in Example 1) | 1.91 |
| Toluene | 32.04 |
| Xylene | 59.89 |
| Portion 2 | |
| Isopropanol | 5.27 |
| Portion 3 | |
| Talc pigment | 86.28 |
| Barytes pigment | 66.77 |
| Zinc oxide pigment | 33.35 |
| Titanium dioxide pigment | 57.13 |
| Molacco carbon black pigment | 1.32 |
| Talc pigment | 74.90 |
| Portion 4 | |
| Talc pigment | 11.39 |
| Portion 5 | |
| Xylene | 29.49 |
| Portion 6 | 165.65 |
| Cellulose acetate butyrate solution (15% solids in a solvent blend of acetone/ toluene 71/29 weight ratio of cellulose acetate butyrate having a butyryl content of about 38% and a viscosity of about 20 seconds) | |
| Portion 7 | |
| Iminated acrylic polymer solution (described above) | 30.34 |
| Portion 8 | |
| Iminated acrylic polymer solution (described above) | 266.37 |
| | Total 1004.00 |

Portion 1 is added to a high shear mixer and thoroughly mixed. Portion 2 is added and mixed for 5 minutes. Portion 3 is added in the other shown with constant mixing until a uniform dispersion is formed. Portion 4 is added and thoroughly mixed. Portion 4 is added and mixed for 2 hours. Portion 6 is added over a 15 minutes period and mixed for an additional 10 minutes. Portion 7 is slowly added with mixing and then mixed for an additional 15 minutes. Portion 8 is added with mixing and mixed an additional 30 minutes. The resulting primer surfacer has a total solids of about 51% and pigment to binder ratio of 177/100.

The primer surfacer composition is reduced to a spray viscosity as in Example 1 using the same solvent mixture as in Example 1. The reduced composition is sprayed onto the same substrates as in Example 1 and air dried. In each case a smooth and uniform finish is formed that has excellent adhesion to the substrate.

Four sets (four panels per set) of phosphatized steel panels are coated with the primer surfacer composition and air dried. One set is coated with an alkyd enamel. A second set is coated with an acrylic automotive lacquer. A third set is coated with a conventional thermosetting acrylic enamel. A fourth set is coated with a polyurethane acrylic enamel. Each set is then air dried or baked as required for the coating. For each of the sets of panels, the resulting finish has a good appearance, excellent chip, blister and corrosion resistance and is considered an acceptable finish for automobiles and trucks.

What is claimed is:

1. A primer-surfacer composition comprising 10-60% by weight of a binder and 40-90% by weight of a solvent for the binder; wherein the binder consists essentially of
   A. 75.0-95.0% by weight, based on the weight of the binder, of an acrylic polymer in solution consisting essentially of
      1. 70-90% by weight of methyl methacrylate,
      2. 9-19% by weight of an alkyl methacrylate having 2-8 carbon atoms in the alkyl group or an alkyl acrylate having 2-12 carbon atoms in the alkyl group, and
      3. 1-11% by weight of either acrylic acid or methacrylic acid that is reacted with 1-8% by weight of an alkylene imine;
   b. 4.9-24.9% by weight, based on the weight of the binder, of a polyester resin in solution which is the esterification product of
      25 to 48 mole percent of a saturated aliphatic dicarboxylic acid selected from the group consisting of adipic acid, succinic acid, malonic acid, glutaric acid, sebacic acid, and azelaic acid;
      40 to 50 mole percent of a glycol selected from the group consisting of ethylene glycol and neopentyl glycol; and
      2 to 35 mole percent of an aromatic carboxylic acid constituent selected from the group consisting of benzoic acid, paratertiary butyl benzoic acid, phthalic acid, phthalic anhydride or mixtures thereof;
      wherein the polyester has a hydroxyl number of not greater than 15 and an acid number of not greater than 10;
   C. 0.1-5.0% by weight, based on the weight of the binder, of an organic pigment dispersant consisting essentially of a material represented by the structure

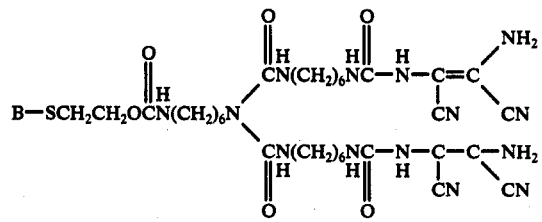

where B is a methyl methacrylate/2-ethylhexyl acrylate copolymeric segment having a number average molecular weight of about 3,000 to 10,000 and
containing pigment in a pigment to binder weight ratio of about 100:100 to about 600:100.

2. The primer-surfacer composition of claim 1 in which the acrylic polymer consists essentially of
   1. 78-82% by weight of methyl methacrylate,
   2. 9-17% by weight of ethyl acrylate, and
   3. 5-9% by weight of methacrylic acid reacted with 4-6% by weight of ethylene imine or propylene imine.

3. The primer-surfacer composition of claim 2 in which the polyester resin is the esterification product of adipic acid, ethylene glycol, benzoic acid and phthalic anhydride.

4. The primer-surfacer composition of claim 1 in which the pigments comprise a blend of talc, barytes, zinc oxide and titanium dioxide.

5. The primer surfacer composition of claim 1 comprising about 15-25% by weight of a binder and correspondingly 75-85% by weight of a solvent for the binder; wherein the binder consists essentially of
   A. 80.0-90.0% by weight of an acrylic polymer in solution consisting essentially of
      1. 78-82% by weight, based on the weight of the acrylic polymer, of methyl methacrylate,
      2. 9-17% by weight, based on the weight of the acrylic polymer, of ethyl acrylate, and 3. 5–9% by weight, based on the weight of the acrylic polymer, of methacrylic acid reacted with about 4–6% by weight of ethylene imine or propylene imine, B. 7.8–19.8% by weight of a polyester resin in solution that is the esterification product of
   25 to 48 mole per cent of adipic acid,
   40 to 50 mole per cent of ethylene glycol, and
   2 to 35 mole per cent of a mixture of phthalic anhydride and benzoic acid, C. 0.2–2.2% by weight of an organic dispersant consisting essentially of a material represented by the structure

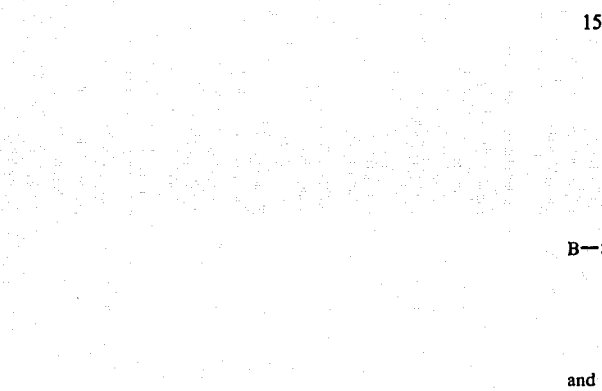

where B is a MMA/2-EHA copolymeric segment having a number averge molecular weight of about 3,000 to 10,000; and containing pigment in a pigment to binder ratio to about 100:100 to 300:100 wherein the pigment consists essentially of a blend of talc, barytes, zinc oxide and titanium dioxide.

6. A primer-surfacer composition comprising 10–60% by weight of a binder and 40–90% by weight of a solvent for the binder; wherein the binder consists essentially of A. 60.0–95.0% by weight, based on the weight of the binder, of an acrylic polymer in solution consisting essentially of
   1. 70–90% by weight of methyl methacrylate,
   2. 9–19% by weight of an alkyl methacrylate having 2–8 carbon atoms in the alkyl group or an alkyl acrylate having 2–12 carbon atoms in the alkyl group, and
   3. 1–11% by weight of either acrylic acid or methacrylic acid that is reacted with 1–8% by weight of an alkylene imine;

B. 4.9–39.9% by weight, based on the weight of the binder, of a polyester resin in solution which is the esterification product of
   25 to 48 mole percent of a saturated aliphatic dicarboxylic acid selected from the group consisting of adipic acid, succinic acid, malonic acid, glutaric acid, sebacic acid, and azelaic acid;
   40 to 50 mole percent of a glycol selected from the group consisting of ethylene glycol and neopentyl glycol; and
   2 to 35 mole percent of an aromatic carboxylic acid constituent selected from the group consisting of benzoic acid, paratertiary butyl benzoic acid, phthalic acid, phthalic anhydride or mixtures thereof;
   wherein the polyester has a hydroxyl number of not greater than 15 and an acid number of not greater than 10;

C. 0.1–8.0% by weight, based on the weight of the binder, of an organic pigment dispersant selected from the group of

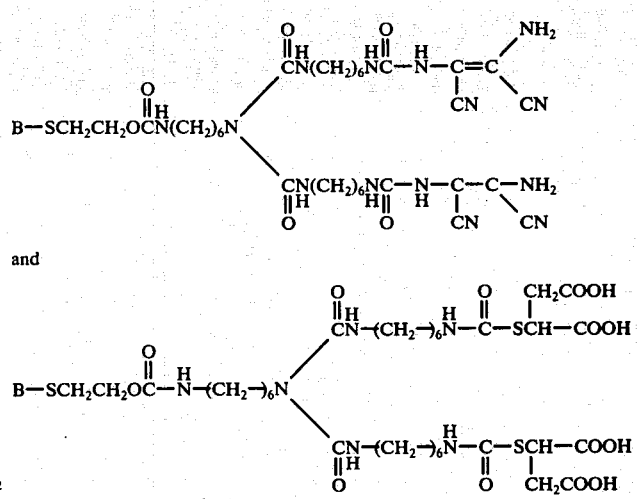

and

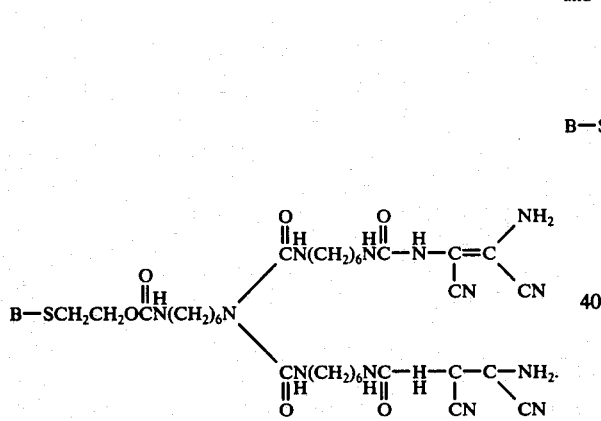

where B is a methyl methacrylate/2-ethylhexyl acrylate copolymeric segment having a number average molecular weight of about 3,000 to 10,000 and containing pigment in a pigment to binder weight ratio of about 100:100 to about 600:100.

7. The primer-surfacer composition of Claim 6 in which the acrylic polymer consists essentially of
   1. 78–82% by weight of methyl methacrylate,
   2. 9–17% by weight of ethyl acrylate, and
   3. 5–9% by weight of methacrylic acid reacted with 4–6% by weight of ethylene imine or propylene imine.

8. The primer-surfacer composition of claim 7 in which the polyester resin is the esterification product of adipic acid, ethylene glycol, benzoic acid and phthalic anhydride.

9. The primer-surfacer composition of claim 8 in which the pigments comprise a blend of talc, barytes, zinc oxide and titanium dioxide.

10. The primer surfacer composition of claim 8 in which the pigments comprise a blend of talc, barytes, zinc oxide, iron oxide and carbon black.

11. The primer surfacer composition of claim 6 containing in addition to the binder constituent up to 20% by weight of cellulose acetate butyrate, based on the weight of the binder; wherein the cellulose acetate buryrate has a butyryl content of about 30–60% by weight and a viscosity of about 2–25 seconds measured at 25° C. determined according to ASTM-D-1343-56.

* * * * *